United States Patent

Takahashi et al.

[15] 3,642,335
[45] Feb. 15, 1972

[54] SEALED BEARING

[72] Inventors: Tadanobu Takahashi; Yoshiro Kan, both of Fujisawa, Japan

[73] Assignee: Nippon Seiko Kabushiki Kaisha, Marunouchi, Chiyoda-ku, Japan

[22] Filed: Sept. 11, 1970

[21] Appl. No.: 71,509

[30] Foreign Application Priority Data

Sept. 12, 1969 Japan..................................44/86234

[52] U.S. Cl. ............................................308/187.1, 277/94
[51] Int. Cl. .....................................F16c 33/76, F16c 33/80
[58] Field of Search .................308/187.1, 187.2; 277/94, 95

[56] References Cited

UNITED STATES PATENTS

| | | | |
|---|---|---|---|
| 3,129,985 | 4/1964 | Watson | 308/187.1 |
| 3,396,977 | 8/1968 | Iguchi | 308/187.2 X |
| 3,414,275 | 12/1968 | Takahashi | 308/187.2 X |
| 3,519,316 | 7/1970 | Göthberg | 308/187.2 X |
| 3,572,857 | 3/1971 | Hasegawa | 308/187.2 |

*Primary Examiner*—Edgar W. Geoghegan
*Assistant Examiner*—Barry Grossman
*Attorney*—Harry G. Shapiro

[57] ABSTRACT

A sealed ball or roller bearing which comprises a pair of seal plates interposed between an outer and inner race, the inner race having a seal groove of a substantially U- or L-shaped cross section formed in the outer surface thereof, each of the seal plates having its outer edge hermetically secured to the outer race, the inner edge portion of the seal plate being formed with an inner seal lip facing the seal groove of the inner race in spaced relationship therewith to provide a reduced clearance therebetween, an intermediate seal lip contacting the seal groove, and an outer seal lip out of contact with the seal groove to provide a labyrinth clearance therebetween, thus forming a seal portion of the bearing which is suitable for low-torque high-speed rotation.

3 Claims, 4 Drawing Figures

PATENTED FEB 15 1972　　3,642,335

INVENTORS
TADANOBU TAKAHASHI
AND
BY  YOSHIRO KAN

Harry G. Shapiro
ATTORNEY

SEALED BEARING

BACKGROUND OF THE INVENTION

1. Field of the Invention

This invention relates to a sealed ball or roller bearing, and more particularly to improvements in or relating to such a sealed bearing whereby leakage of grease from the bearing as well as entry of any harmful foreign matters such as dust, water, etc., can be reliably prevented and the loss of torque resulting from seal plates can be minimized so as to make the bearing suitable for low-torque high-speed rotation.

2. Description of the Prior Art

The known seal portions of sealed bearings are generally grouped into two types, i.e., the contact seal-lip type and the noncontact seal-lip type. The former or contact type of seal is excellent in sealing effect but it is unsuitable for high-speed rotation because the contact pressure imparted by the seal lip results in a great torque which in turn causes the heating or tear and wear of the contact lip. The latter or noncontact type of seal is suitable for high-speed rotation, whereas it is inferior in sealing performance. Thus, these known types of seal portion in the sealed bearing have both merits and demerits.

In order to eliminate the demerits existing in the known seal structure, it has been proposed such a system as shown in U.S. Pat. No. 3,113,814, in which a combination of the described contact type and noncontact type is utilized whereby one of two seal lips or tongues formed inwardly of a seal plate is maintained in contact with a seal groove formed in an inner bearing race while the other seal lip or tongue is maintained out of contact with the seal groove. In such a simple combination of the different types, however, any configurational or dimensional irregularity present in the seal lips and inner race seal groove and any mounting error of the seal plate may result in a great variation in the contact pressure of the contact seal lip as well as in the labyrinth clearance formed between the noncontact lip and the seal groove, which variation makes it impossible to achieve a sufficient sealing performance. Moreover, such a type of seal lip unavoidably provides an increased contact pressure which means a great difficulty to reduce the torque.

The slight modifications or improvements simply applied to the known seal structure such as disclosed in the aforesaid U.S. Pat. cannot produce a sealed bearing which is suitable for low-torque high-speed operation and excellent in sealing effect, and the problems described above could not be solved.

SUMMARY OF THE INVENTION

It is therefore the object of the present invention to eliminate the demerits of the prior art and provide a sealed ball or roller bearing which is highly excellent in sealing performance and well adapted for low-torque high-speed operation.

To achieve such an object, the sealed bearing of the present invention comprises an outer and an inner race, and a pair of seal plates interposed therebetween. Each of these seal plates has its outer edge hermetically secured to the inner surface of the outer race, while the inner edge portion of the seal plate includes an inner lip extending axially of the bearing, an intermediate lip extending obliquely inwardly of the bearing and an outer lip extending radially of the bearing. The inner race has substantially U-contoured seal grooves formed in the outer surface thereof along the opposite edges, each of the seal grooves being defined by a shoulder, a vertically extending sidewall contiguous to the shoulder, a flat bottom wall contiguous to the sidewall and a projected edge extended from the bottom wall. The inner lip of the seal plate is disposed in such a manner that the tip end thereof is in opposed and spaced relationship with the shoulder of the seal groove so as to provide a reduced clearance therebetween, the outer lip forms a labyrinth clearance with respect to the projected edge of the seal groove, and the intermediate lip is in contact with the sidewall of the seal groove, whereby there is formed a seal portion having a highly excellent sealing performance and suitable for low-torque high-speed operation.

The above and other objects and features of the present invention will become fully apparent from the following illustrative description taken in conjunction with the accompanying drawings showing some specific embodiments of the invention.

DESCRIPTION OF THE PREFERRED EMBODIMENTS

Figure 1:
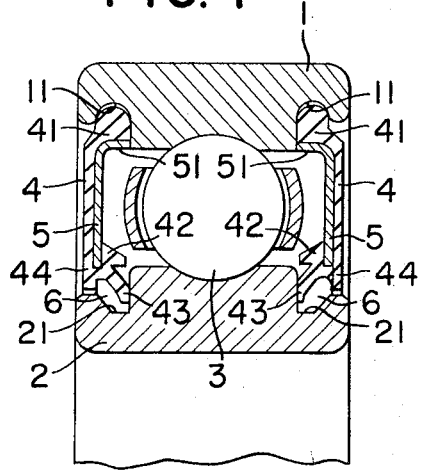
FIG. 1 is a fragmentary longitudinal section showing an example of the sealed ball bearing provided according to the present invention.
Figure 2:
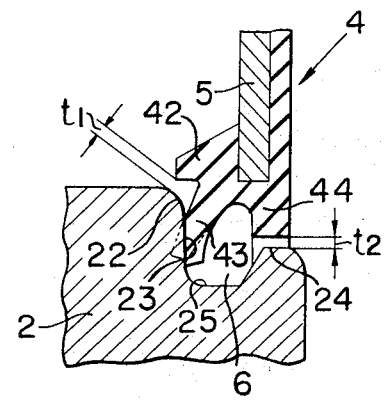
FIG. 2 is an enlarged, fragmentary section illustrating the details of the seal portion of the bearing shown in FIG. 1.

Referring to FIGS. 1 and 2, a form of the ball bearing assembly embodying the present invention is shown which includes an outer race 1, an inner race 2, rolling members 3 (only one of which is shown for convenience), a pair of seal plates 4 interposed between the outer and inner races 1 and 2 and formed of an elastic material such as rubber, synthetic resin or the like, core members 5 reinforcing the seal plates 4, and pockets 6 forming grease seal portions. The outer race 1 has stop grooves 11 formed in the inner side surface thereof at the opposite edges, and the inner race 2 has substantially U-contoured seal grooves 21 formed in the outer side surface thereof at the opposite edges. The U-shaped contour of each seal groove 21 is defined by a rounded shoulder 22, a vertically extending sidewall 23 contiguous to the shoulder 22, a flat bottom wall 25 extending horizontally outwardly from the sidewall 23, and an upwardly projected edge 24 extended from the bottom wall 25.

In the embodiment shown in FIGS. 1 and 2, each seal plate 4 is formed of rubber and reinforced by the core member 5 having an inwardly turned edge 51. Adjacent to this inwardly turned edge 51 of the core member 5, the seal plate 4 has an outwardly bulged outer edge 41 which is closely fitted in the stop groove 11 of the outer race 1. At the inner edge portion of the seal plate 4 there is formed an inner lip 42 extending axially of the bearing to chiefly prevent the leakage of grease, a relatively flexible or yieldable intermediate lip 43 extending obliquely inwardly of the bearing to shield the interior thereof from the exterior, and an outer lip 44 extending radially of the bearing to chiefly prevent the entry of dust, water and other harmful foreign matters from outside the bearing. These seal lips 42 to 44 should preferably be formed so as to work independently of one another without making any interference therebetween.

When the seal plate 4 is assembled to the bearing with the bulged outer edge 41 thereof closely fitted in the stop groove 11 as shown in FIG. 1, the lips 42 to 44 of the seal plate 4 formed in the opposite edge portion thereof take the position as clearly shown in FIG. 2, wherein the inner lip 42 has its tip end opposed to the curved surface of the rounded shoulder 22 of the inner race seal groove 21 in such a relationship that a predetermined reduced clearance $t_1$ is maintained between the tip end of the inner lip 42 and the curved surface of the shoulder 22, while the outer lip 44 is spaced apart from the projected edge surface 24 in such a relationship that a narrow labyrinth clearance $t_2$ is formed therebetween. Thus, there are provided two noncontact seal portions in the bearing. The other seal lip, i.e., the intermediate lip 43 is in intimate contact with the sidewall 23 of the inner race seal groove 21 so as to form a contact seal portion. It will thus be appreciated that the seal of the bearing assembly is accomplished by a combination of two different types of seal, namely, the noncontact seal and the contact seal.

Figure 3:
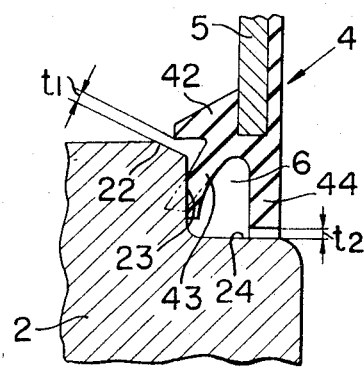
FIG. 3 is a view similar to FIG. 2 but showing another form of the seal portion according to the present invention.

Turning to FIG. 3, there is shown another form of the seal according to the present invention. In this alternative embodiment, the seal groove 21 has a generally L-shaped contour provided by a sloped shoulder 22, a sidewall 23 vertically extending from the shoulder 23, and a flat steplike edge 24 horizontally extending from the sidewall 23.

The formation of various lips in the inner edge portion of the seal plate 4 and their relationships with the associated seal groove 21 are essentially the same as described with respect to the embodiment of FIGS. 1 and 2.

Figure 4:
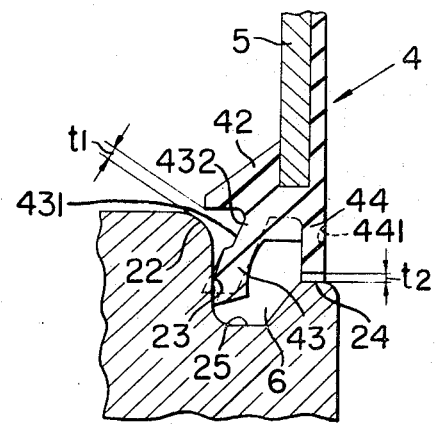
FIG. 4 is also a similar view to FIG. 2 but showing still another form of the present invention.

FIG. 4 shows a still another example of the present invention, in which the various seal lips are ensured to work independently without interfering with one another. In this embodiment, the intermediate seal lip 43 may have a recess 431 formed in the root portion thereof adjacent to the seal plate 4 so as to provide a reduced neck portion 432. The formation of such a reduced or thinner neck portion provides the intermediate lip 43 with a greater degree of flexibility or yieldability, whereby the intermediate lip 43 interferes in no way with the inner and outer lips 42 and 44.

The neck portion 432 of the intermediate lip 43 may have a longer back surface as indicated by a dotted line. In this case, the outer lip 44 may be formed with a groove 441 along the outer side thereof so as to provide a greater deformability of the outer lip and thereby facilitate the rapping of the seal plate during the molding process.

The seal groove 21 formed in the inner race of the present embodiment has the same contour as that shown in FIG. 2, except that the shoulder 22 is provided by a combination of a slightly tapered surface and a curved surface.

As has been described hitherto, the sealed ball bearing of the present invention, or more specifically the seal portion thereof has three seal lips formed so that the intermediate lip 43 contacting the sidewall of the inner race seal groove 21 is interposed between the noncontact innerlip 42 providing a reduced clearance $t_1$ with respect to the seal groove and the noncontact lip 44 providing a labyrinth clearance $t_2$ with respect to the seal groove, and this construction leads to various favorable results described hereunder.

a. The tendency of the grease in the bearing to leak outwardly through the reduced clearance $t_1$ between the lip 42 and the shoulder 22 due to the mobility, softening or other factor of the grease occurring during the rotation of the bearing is completely eliminated by the intermediate lip 43 which is in intimate contact with the sidewall 23 formed in the inner race, thus perfectly preventing the heating or burning of the bearing which would otherwise arise from the shortage of the grease and ensuring a long service life of the bearing without undergoing any inspection during the use.

b. Dust, water or other harmful foreign matters which are likely to enter the bearing through the labyrinth clearance $t_2$ between the outer lip 44 and the projected or flat outer edge of the seal groove 21 is completely shielded by the intermediate seal lip 43 of the contact type, thus perfectly eliminating the dangers such as deterioration of the interior grease which would result from the entry of such foreign matters and destruction or damage imparted to the bearing by the invasion of solid foreign particles.

c. A certain degree of damage which may be imparted to the outer lip 44 by carelessly handling the bearing or by foreign particles entering thereinto during the use can be compensated for by the intermediate lip 43 which always obstructs the direct invasion of foreign matters into the interior of the bearing, and thus the bearing can be put into service without replacing the partly damaged seal plate 4 by a new one.

d. The relatively great flexibility and yieldability of the intermediate lip 43 as well as the lubrication of its contact surface provided by the initial leakage of grease (i.e., a slight degree of grease leakage occurring during the running-in of the fresh bearing) serves to eliminate not only the tear and wear of that lip but also the increased torque or heating thereof resulting from the contact between the intermediate lip and inner race, thus ensuring a low torque and a high-speed rotation of the same degree as achieved by the bearing having the conventional noncontact-type seal.

e. The reduced clearance $t_1$ provided between the tip end of the inner lip 42 and the opposed shoulder 22 of the seal groove 21 compensates for any dimensional errors of the shoulder and inner lip in the axial and radial direction so that such errors may actually be smaller than their apparent values. Thus, any dimensional irregularity arising in these parts during the course of manufacture or assemblage may hardly cause the inner lip 42 to contact the shoulder 22 or cause the reduced clearance $t_1$ to be greater than a predetermined value and hamper the sealing performance.

It will readily be seen that these advantages directly lead to a more excellent sealing and rotating performance as well as a longer service life which could never be attained by any sealed bearing of the prior art. It is also to be understood that the present invention is applicable only to the seal portion of a sealed bearing and does not restrict any other part thereof.

What is claimed is:

1. A sealed ball or roller bearing comprising an outer and an inner race, and a pair of seal plates interposed between said outer and inner races, each of said seal plates having its outer edge hermetically secured to the inner surface of said outer race, the inner edge portion of said seal plate including an inner lip extending axially of the bearing, an intermediate lip extending obliquely inwardly of the bearing and an outer lip extending radially of the bearing, said inner race having substantially U-contoured seal grooves formed in the outer surface thereof along the opposite edges, each of said seal grooves being defined by a shoulder, a vertically extending sidewall contiguous to said shoulder, a flat bottom wall contiguous to said sidewall and a projected edge extended from said bottom wall, said inner lip of said seal plate being disposed in such a manner that the tip end thereof is in opposed and spaced relationship with said shoulder of said seal groove so as to provide a reduced clearance therebetween, said outer lip forming a labyrinth clearance with respect to said projected edge of said seal groove, said intermediate lip being in contact with said sidewall of said seal groove to thereby form a seal portion.

2. A sealed ball or roller bearing comprising an outer and an inner race, and a pair of seal plates interposed between said outer and inner races, each of said seal plates having its outer edge hermetically secured to the inner surface of said outer race, the inner edge portion of said seal plate including an inner lip extending axially of the bearing, an intermediate lip extending obliquely inwardly of the bearing and an outer lip extending radially of the bearing, said inner race having substantially L-contoured seal grooves in the outer surface thereof along the opposite edges, each of said seal grooves being defined by a shoulder, a vertically extending sidewall contiguous to said shoulder and a steplike surface extending horizontally therefrom said inner lip of said seal plate being disposed in such a manner that the tip end thereof is in opposed and spaced relationship with said shoulder of said seal groove so as to provide a reduced clearance therebetween, said outer lip forming a labyrinth clearance with respect to said steplike surface of said seal groove, said intermediate lip being in contact with said sidewall of said seal groove to thereby form a seal portion.

3. A sealed bearing as defined in claim 1, wherein said intermediate lip of said seal plate has a reduced neck portion to provide a greater flexibility of that lip.

* * * * *